(12) United States Patent
Hattori et al.

(10) Patent No.: US 10,511,453 B2
(45) Date of Patent: Dec. 17, 2019

(54) INFORMATION PROCESSING SYSTEM AND CHARGE CALCULATION APPARATUS

(71) Applicant: FUJITSU LIMITED, Kawasaki-shi, Kanagawa (JP)

(72) Inventors: Ayako Hattori, Urayasu (JP); Ayae Okubo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/106,876

(22) Filed: Aug. 21, 2018

(65) Prior Publication Data

US 2019/0089549 A1 Mar. 21, 2019

(30) Foreign Application Priority Data

Sep. 19, 2017 (JP) ................................ 2017-179040

(51) Int. Cl.
*H04L 12/14* (2006.01)
*G06Q 20/14* (2012.01)
*G06Q 10/06* (2012.01)

(52) U.S. Cl.
CPC ......... *H04L 12/1421* (2013.01); *G06Q 10/06* (2013.01); *G06Q 20/145* (2013.01); *H04L 12/1432* (2013.01); *H04L 12/1453* (2013.01)

(58) Field of Classification Search
CPC ............. H04L 12/1421; H04L 12/1453; H04L 12/1432; G06Q 20/145

See application file for complete search history.

(56) References Cited

U.S. PATENT DOCUMENTS

| 2009/0049444 A1* | 2/2009 | Ottavi ................ G06Q 10/0631 718/101 |
| 2014/0164620 A1 | 6/2014 | Tamura |
| 2015/0019393 A1 | 1/2015 | Murai et al. |
| 2017/0134589 A1* | 5/2017 | Haslestad ............. H04M 15/10 |

FOREIGN PATENT DOCUMENTS

| JP | 2006-155514 | 6/2006 |
| JP | 2015-18361 | 1/2015 |
| JP | 2017-16513 | 1/2017 |

OTHER PUBLICATIONS

Extended European Search Report dated Oct. 31, 2018 in corresponding European Patent Application No. 18189923.8.

(Continued)

*Primary Examiner* — Muthuswamy G Manoharan
(74) *Attorney, Agent, or Firm* — Staas & Halsey LLP

(57) ABSTRACT

A user tag addition apparatus adds user tags, each of which includes an organization code and a unit price code, to respective service use requests. A service execution apparatus executes provision services based on service use requests, associates the usages of a resource used for the execution of the provision services with the corresponding user tags, and registers the associated information in use result information. A charge calculation apparatus calculates charges for the provision services for each organization based on unit price information corresponding to the unit price codes indicated in the user tags registered in the use result information and the usages of the resource associated with the user tags.

9 Claims, 17 Drawing Sheets

(56) References Cited

OTHER PUBLICATIONS

Japanese Platform for Patent Information English abstract for Japanese Patent Publication No. 2006-155514, published Jun. 15, 2006.
Japanese Platform for Patent Information English abstract for Japanese Patent Publication No. 2015-18361, published Jan. 29, 2015.
Japanese Platform for Patent Information English abstract for Japanese Patent Publication No. 2017-16513, published Jan. 19, 2017.
European Office Action dated May 23, 2019 in European Patent Application No. 18 189 923.8 (9 pages).

* cited by examiner

112 USER TEMPLATE

```
<USER TEMPLATE (CLOUD VENDER A)>
[CURRENCY RATE]
1USD - 120JPY

[Calcurate by usagerate]
c1,ORGANIZATION INFORMATION,SOSHIKI_MASTER
c2,#TANKA-A01,SUM(Volume*Usage)
c3,#TANKA-C01,SUM(Volume*Usage)
c4,#TANKA-N01,(SUM(Usage)/TOTAL_SUM(Usage ALL))*100 %
c5,SUPPORT,(SUM(Usage #SOSHIKI)/TOTAL_SUM(Usage ALL))*100 %

[OutputCSV]
1,ORGANIZATION INFORMATION,c1
------------------------------------------------
2,UNIT PRICE CODE,(c2,c3)
3,SERVICES USED,UnitcodeName
4,PRICE (NET PRICE),*Price
5,PRICE (SELLING PRICE),*UnitPrice
------------------------------------------------
2,UNIT PRICE CODE,(c4,c5)
3,SERVICES USED,UnitcodeName
3,PRICE (NET PRICE),*SUM(Usage)*Price
4,PRICE (SELLING PRICE),*SUM(Usage)*UnitPrice
------------------------------------------------
```

FIG. 6

113 ORGANIZATION INFORMATION

133a ORGANIZATION CODE TABLE

```
<SOSHIKI_MASTER>
COMPANY A,#SOSHIKI-A01
COMPANY B,#SOSHIKI-B01,#SOSHIKI-B02
COMPANY C,#SOSHIKI-C01,#SOSHIKI-C03
  :
```

133b USER INFORMATION TABLE

```
<User_MASTER>
#SOSHIKI-A01,user_ID#1,pwd#1
#SOSHIKI-B01,user_ID#2,pwd#2
#SOSHIKI-B02,user_ID#3,pwd#3
  :
```

FIG. 7

114 UNIT PRICE MANAGEMENT TABLE

| UNIT PRICE CODE | ITEM NAME | UNIT PRICE (/h) | CLOUD VENDER α | CLOUD VENDER β | CLOUD VENDER γ |
|---|---|---|---|---|---|
| TANKA-A01 | BASIC VIRTUAL MACHINE TEMPLATE A01 (MINIMUM CONFIGURATION) | ¥18.3 | VIRTUAL MACHINE ONE SMALL INSTANCE (1CPU, 3.5 GB MEMORY) / 30 GB HDD / SUBSCRIPTION OF OS#1 | VIRTUAL MACHINE ONE S1 INSTANCE (1CPU, 2.0 GB MEMORY) / 25 GB HDD / SUBSCRIPTION OF OS#1 | VIRTUAL MACHINE ONE A-1 INSTANCE (1CPU, 1.75 GB MEMORY) / 30 GB HDD / SUBSCRIPTION OF OS#1 |
| TANKA-A02 | BASIC VIRTUAL MACHINE TEMPLATE A02 (MINIMUM CONFIGURATION) | ¥25.5 | VIRTUAL MACHINE ONE SMALL INSTANCE (1CPU, 3.5 GB MEMORY) / 30 GB HDD / STANDARD LICENSE OF OS#2 | VIRTUAL MACHINE ONE S1 INSTANCE (1CPU, 2.0 GB MEMORY) / 25 GB HDD / STANDARD LICENSE OF OS#2 | VIRTUAL MACHINE ONE A-1 INSTANCE (1CPU, 1.75 GB MEMORY) / 30 GB HDD / STANDARD LICENSE OF OS#2 |
| TANKA-B01 | BASIC VIRTUAL MACHINE TEMPLATE B01 (MEDIUM SCALE) | ¥78.0 | VIRTUAL MACHINE ONE MEDIUM INSTANCE (4CPU, 28 GB MEMORY) / 40 GB HDD / SUBSCRIPTION OF OS#1 | VIRTUAL MACHINE ONE M1 INSTANCE (8CPU, 56 GB MEMORY) / 40 GB HDD / SUBSCRIPTION OF OS#1 | VIRTUAL MACHINE ONE A-4 INSTANCE (4CPU, 28 GB MEMORY) / 60 GB HDD / SUBSCRIPTION OF OS#1 |
| ... | ... | ... | ... | ... | ... |
| TANKA-A20 | ADDITION OF VIRTUAL MACHINE, ONE HDD | ¥3.5 | 30 GB HDD | 25 GB HDD | 30 GB HDD |
| TANKA-A21 | ADDITION OF VIRTUAL MACHINE, TWO HDDs | ¥7.0 | 30 GB HDD | 25 GB HDD | 30 GB HDD |
| ... | ... | ... | ... | ... | ... |

FIG. 8

114 UNIT PRICE MANAGEMENT TABLE

| UNIT PRICE CODE | ITEM NAME | UNIT PRICE (/h) | CLOUD VENDER α | CLOUD VENDER β | CLOUD VENDER γ |
|---|---|---|---|---|---|
| ... | ... | ... | ... | ... | ... |
| TANKA-N01 | BASIC NETWORK TEMPLATE A01 (MINIMUM CONFIGURATION) | ¥12.0 | ONE VIRTUAL NETWORK ADDRESS 100 Mbps SHARED STANDARD FIREWALL ONE GLOBAL IP ADDRESS | ONE VIRTUAL NETWORK ADDRESS 150 Mbps SHARED ONE GLOBAL IP ADDRESS | ONE VIRTUAL NETWORK ADDRESS 100 Mbps SHARED BASIC GATEWAY FUNCTION ONE GLOBAL IP ADDRESS |
| ... | ... | ... | ... | ... | ... |
| TANKA-N11 | ADDITION OF GLOBAL IP ADDRESS (PER ADDRESS) | ¥30.0 | GLOBAL IP ADDRESS | GLOBAL IP ADDRESS | GLOBAL IP ADDRESS |
| TANKA-N51 | DATA TRANSFER AMOUNT (MINIMUM CONFIGURATION) (Inbound/Outbound = 0.1 GB/SEC) | ¥5.5 | DATA TRANSFER AMOUNT INBOUND COMMUNICATION 0.02 GB/SEC DATA TRANSFER AMOUNT OUTBOUND COMMUNICATION 0.08 GB/SEC | DATA TRANSFER AMOUNT INBOUND/OUTBOUND PACKETS 0.09 GB/SEC | DATA TRANSFER AMOUNT INBOUND PACKETS 2.0 GB/h DATA TRANSFER AMOUNT OUTBOUND PACKETS 2.0 GB/h |
| ... | ... | ... | ... | ... | ... |
| TANKA-XX1 | PRIVATE APP SERVICE PREMIUM S | ¥45.0 | — | — | — |
| TANKA-XX2 | DATABASE SERVICE EXCESS DATA | ¥320.0 | — | — | — |
| ... | ... | ... | ... | ... | ... |

TEMPORARY UNIT PRICE CODE

FIG. 9

115 SUPPORT CHARGE TABLE

| SUPPORT SERVICE CODE | ITEM NAME | UNIT PRICE (/MONTH) |
|---|---|---|
| TANKAS-SP01 | BASIC SUPPORT SERVICE SET 1<br>・BASIC MONITORING OF VIRTUAL MACHINES (UP TO 10 MACHINES)<br>・BASIC MONITORING OF NETWORKS (UP TO 3 ADDRESSES)<br>・MANAGEMENT OF SUBSCRIPTION CONTRACTS (UP TO 3 SUBSCRIPTIONS)<br>・MAIL/TELEPHONE SUPPORT (UP TO 5 TIMES PER MONTH) | ¥25,000 |
| TANKAS-SP02 | BASIC SUPPORT SERVICE SET 2<br>・BASIC MONITORING OF VIRTUAL MACHINES (UP TO 15 MACHINES)<br>・BASIC MONITORING OF NETWORKS (UP TO 5 ADDRESSES)<br>・MANAGEMENT OF SUBSCRIPTION CONTRACTS (UP TO 5 SUBSCRIPTIONS)<br>・MAIL/TELEPHONE SUPPORT (UP TO 10 TIMES PER MONTH) | ¥65,000 |
| ⋮ | ⋮ | ⋮ |
| TANKAS-SP30 | ADDITION OF BASIC MONITORING OF VIRTUAL MACHINES (ADDS BY THE 10 MACHINES) | ¥20,000 |
| TANKAS-SP31 | ADDITION OF BASIC OPTION OF VIRTUAL MACHINES (ADDS BY THE 10 MACHINES) | ¥50,000 |
| ⋮ | ⋮ | ⋮ |
| TANKAS-SP50 | SUPPORT OF BACK-UP OPERATION OF VIRTUAL MACHINES (PER MACHINE) | ¥80,000 |
| TANKAS-SP51 | SUPPORT OF DR OPERATION OF VIRTUAL MACHINES (PER MACHINE) | ¥12,000 |

FIG. 10

36a SERVICE USE INFORMATION

| ITEM NAME | RESOURCE | USER TAG | USAGE |
|---|---|---|---|
| BASIC VIRTUAL MACHINE TEMPLATE A01 (MINIMUM CONFIGURATION) | ・Small Instance(1CPU,3.5 GB)<br>・data-disk1 30 GB<br>・SUBSCRIPTION OF OS#1 | #TANKA-A01<br>#SOSHIKI-A01 | 3600s |
| BASIC VIRTUAL MACHINE TEMPLATE C01 (LARGE SCALE CONFIGURATION) | ・Large Instance(4CPU,12 GB)<br>・data-disk1 250 GB<br>・STANDARD LICENSE OF OS#2 | #TANKA-C01<br>#SOSHIKI-A01 | 2400s |
| BASIC NETWORK TEMPLATE A01 (MINIMUM CONFIGURATION) | Network001<br>192.168.0.1/24 | #TANKA-N01<br>#SOSHIKI-A01 | 25000pkts |
| ... | ... | ... | ... |

FIG. 11

70 INTERMEDIATE DATA

```
<INTERMEDIATE FORMAT (EXAMPLE WHERE COMPANIES A AND B COEXIST)>
ORGANIZATION CODE,UNIT PRICE CODE,ITEM NAME,USAGE,PRICE (NET PRICE),DISCOUNT,SUPPORT CHARGE
#SOSHIKI-A01,#TANKA-A01, CloudVender-ServiceAA,3600s,0.08$/s,,
#SOSHIKI-A01,#TANKA-A01, CloudVender-ServiceDATADISK,3600s * 50,0.002$/s,,
#SOSHIKI-A01,#TANKA-A01, CloudVender-ServiceOS#1,3600s * 1,0.02$/s,,
#SOSHIKI-A01,#TANKA-C01, CloudVender-ServiceXX,2400s,0.23$/s,,
#SOSHIKI-A01,#TANKA-C01, CloudVender-ServiceDATADISK,3600s * 250,0.002$/s,,
#SOSHIKI-A01,#TANKA-C01, CloudVender-ServiceOS#2,3600s * 1,.015$/s,,
#SOSHIKI-A01,#TANKA-N01, CloudVender-ServiceNWL1,25000pkts,0.05$/pkts,,
#SOSHIKI-B01,#TANKA-A01, CloudVender-ServiceAA,2400s,0.23$/s,,
#SOSHIKI-B01,#TANKA-A01, CloudVender-ServiceDATADISK,3600s * 250,0.002$/s,,
#SOSHIKI-B01,#TANKA-N01, CloudVender-ServiceNWL1,5000pkts,0.05$/pkts,,
```

71 BILLING DATA

```
<BILLING DATA>
■CLOUD VENDER A,B
DISCOUNT RATE:-15%
SUPPORT CHARGE RATE:40%
NETWORK USAGE RATE:71%
ORGANIZATION CODE,UNIT PRICE CODE,ITEM NAME,PRICE (NET PRICE),PRICE (SELLING PRICE)
#SOSHIKI-A01,#TANKA-A01, UNIT PRICE A01 SERVICE,¥77760,¥65880
#SOSHIKI-A01,#TANKA-C01, UNIT PRICE C01 SERVICE,¥282240,¥210000
#SOSHIKI-A01,#TANKA-N01, UNIT PRICE N01 SERVICE,¥149100,¥127500
#SOSHIKI-A01,#TANKAS-SP01, SUPPORT CHARGE,,¥24000
```

INFORMATION PROCESSING SYSTEM AND CHARGE CALCULATION APPARATUS

CROSS-REFERENCE TO RELATED APPLICATION

This application is based upon and claims the benefit of priority of the prior Japanese Patent Application No. 2017-179040, filed on Sep. 19, 2017, the entire contents of which are incorporated herein by reference.

FIELD

The embodiments discussed herein relate to an information processing system and a charge calculation apparatus.

BACKGROUND

In recent years, more and more people have been using cloud computing systems, which will simply be referred to as clouds. This increase in the number of cloud users has brought about a new trend in which a plurality of organizations forms a single group and makes a comprehensive contract for clouds as the group. Namely, each organization in this group does not make an individual contract for a cloud. For example, a company group to which a plurality of companies belong could make a single contract with a cloud service provider. Making a comprehensive contract as a group offers benefits. For example, when a group of companies makes a comprehensive contract, they are able to receive a higher discount rate.

When a group of companies makes a comprehensive contract with a cloud service provider, the group of companies is collectively charged by the service provider for the comprehensive contract. In this case, for example, a department (a cloud contract management department) that manages billing and operations of the cloud contract of the group pays the charges for the clouds to the service provider. Next, the cloud contract management department calculates a charge billed to an individual organization using a cloud and bills each organization a corresponding charge.

To calculate the charges billed to a plurality of users for cloud services, various techniques have been considered. For example, there has been proposed a billing system capable of performing billing and a discount on the billing for each organization for users of services by application service providers (ASPs). In addition, there has been proposed an information processing device that allows a plurality of users to share the charges of services used by the users. In addition, there has been proposed a billing information generation device that easily calculates the charge of each of a plurality of users about the service charges billed to a representative user. See the following documents, for example.

Japanese Laid-open Patent Publication No. 2006-155514
Japanese Laid-open Patent Publication No. 2015-018361
Japanese Laid-open Patent Publication No. 2017-016513

When a plurality of organizations that forms a group use clouds and are collectively charged for use of the clouds, it is appropriate to determine the charge to each organization based on the usage of the cloud by each organization. However, with the conventional techniques, an appropriate charge based on the usage for each organization of the group using the clouds is not calculated. This problem arises not only when clouds are used but also when a plurality of organizations shares the charge for use of services provided via a network.

SUMMARY

According to one aspect, there is provided an information processing system including: a user tag addition apparatus including a first memory and a first processor which is connected to the first memory and performs a procedure including adding, to the service use requests, user tags including organization codes, which are identifiers of organizations to which terminal apparatuses that have transmitted service use requests belong, and unit price codes, which are identifiers indicating unit price information per unit usage of a resource for execution of provision services to be provided based on the service use requests; a service execution apparatus including a second memory and a second processor which is connected to the second memory and performs a procedure including executing the provision services based on the service use requests each time the service execution apparatus receives the service use requests and registering the user tags added to the service use requests and usages of the resource used for the execution of the provision services in association with each other in use result information; and a charge calculation apparatus including a third memory and a third processor which is connected to the third memory and performs a procedure including acquiring the use result information of a charge calculation target organization group from the service execution apparatus, extracting, based on the organization codes included in the user tags registered in the acquired use result information, the user tags for each organization that belongs to the charge calculation target organization group from the use result information, and calculating charges for the provision services for the each organization based on unit price information corresponding to the unit price codes included in the extracted user tags and the usages of the resource associated with the user tags.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a user template;

FIG. 7 illustrates an example of organization information;

FIG. 8 illustrates a first example of a unit price management table;

FIG. 9 illustrates a second example of the unit price management table;

FIG. 10 illustrates an example of a support charge table;

FIG. 11 illustrates an example of service use information;

FIG. 13 illustrates an example of intermediate data;

FIG. 14 illustrates an example of billing data;

DESCRIPTION OF EMBODIMENTS

Figure 1:
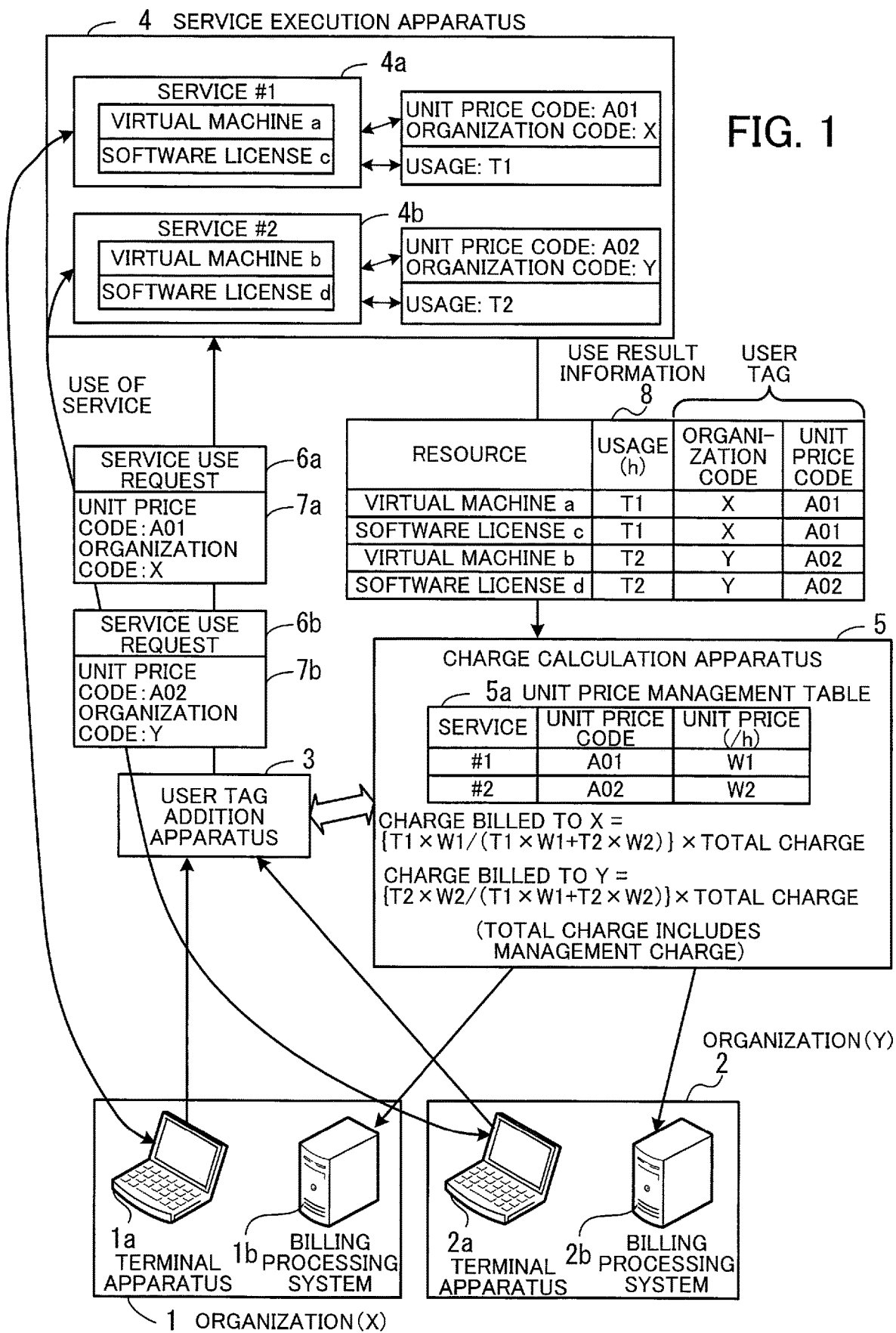
FIG. 1 illustrates an example of an information processing system according to a first embodiment.

Next, embodiments will be described below with reference to the accompanying drawings, wherein like reference characters refer to like elements throughout. An individual embodiment may be realized by combining a plurality of embodiments, as long as the combination does not cause contradiction.

First Embodiment

First, a first embodiment will be described.

FIG. 1 illustrates an example of an information processing system according to a first embodiment. The information processing system according to the first embodiment includes terminal apparatuses 1a and 2a of a plurality of organizations 1 and 2, respectively, a user tag addition apparatus 3, a service execution apparatus 4, and a charge calculation apparatus 5. Each of the terminal apparatuses 1a and 2a, the user tag addition apparatus 3, the service execution apparatus 4, and the charge calculation apparatus 5 is realized by, for example, a computer including a processor and a memory. The service execution apparatus 4 is, for example, a cloud computing system (an individual cloud) established by a plurality of computers.

The present description assumes that the organizations 1 and 2 form a single group and that this group has made a single contract for use of the service execution apparatus 4 with a service provider that provides services by using the service execution apparatus 4. In this case, the service provider collectively charges the organizations 1 and 2 for the use of the service execution apparatus 4. Thus, each of the organizations 1 and 2 calculates an appropriate charge based on the corresponding usage of the service execution apparatus 4 by using the user tag addition apparatus 3 and the charge calculation apparatus 5. The following description will be made on a procedure of processing for calculating the charges billed to the organizations 1 and 2 from usage of services provided by the service execution apparatus 4.

The charge calculation apparatus 5 includes information about a unit price management table 5a in advance. The unit price management table 5a includes, in association with each of a plurality of services, unit price information indicating an individual unit price (W1, W2) per unit usage of a resource (or a set of resources) used for execution of the corresponding service and an individual unit price code (A01, A02), which is an identifier of the unit price information.

The terminal apparatuses 1a and 2a receive user input and accordingly transmit service use requests 6a and 6b, respectively, addressed to the service execution apparatus 4. The user tag addition apparatus 3 relays the service use requests 6a and 6b.

The user tag addition apparatus 3 adds user tags 7a and 7b to the service use requests 6a and 6b transmitted from the terminal apparatuses 1a and 2a of the organizations 1 and 2, respectively, based on the unit price management table 5a. The user tags 7a and 7b include organization codes (X and Y), which are identifiers of the organizations 1 and 2 having the terminal apparatuses 1a and 2a that transmit the service use requests 6a and 6b, and the unit price codes (A01 and A02) corresponding to provision services 4a and 4b executed based on the service use requests 6a and 6b, respectively. In this way, the service use requests 6a and 6b, to which the respective user tags 7a and 7b have been added, are transmitted to the service execution apparatus 4.

Each time a service use request is transmitted, the service execution apparatus 4 executes a corresponding one of the provision services 4a and 4b based on the transmitted service use request. For example, the service execution apparatus 4 starts virtual machines based on the service use requests 6a and 6b. Next, the service execution apparatus 4 applies software licenses to the started virtual machines and have the virtual machines execute corresponding services based on the service use requests 6a and 6b. In addition, the service execution apparatus 4 associates usages (T1 and T2) of the resources used for execution of the provision services 4a and 4b with the user tags 7a and 7b added to the transmitted service use request 6a and 6b, respectively, and registers the associated information in use result information 8. For example, the time for which the virtual machines have been activated is used as the usages (T1 and T2) of the resources.

The charge calculation apparatus 5 acquires the use result information 8 about the organization group as the charge calculation target from the service execution apparatus 4. The use result information 8 includes the usages (T1 and T2) of the resources used for execution of the services 4a and 4b provided to the organizations 1 and 2 in the organization group and the user tags 7a and 7b corresponding to the usages (T1 and T2) of the resources. Next, the charge calculation apparatus 5 acquires, from the unit price management table 5a, the unit prices (W1 and W2) corresponding to the unit price codes (A01 and A02) indicated in the respective user tags 7a and 7b. Next, the charge calculation apparatus 5 extracts a user tag for each organization belonging to the organization group from the use result information 8 based on the organization codes included in the user tags 7a and 7b registered in the acquired use result information 8.

Next, the charge calculation apparatus 5 calculates the charges of the provision services 4a and 4b for each organization based on the unit price information (W1 and W2) corresponding to the unit price codes (A01 and A02) included in the extracted user tags 7a and 7b and the usages of the resources associated with the user tags 7a and 7b. For example, the charge calculation apparatus 5 acquires a user tag including the organization code of one of the charge calculation target organizations and the usage of the resource corresponding to the user tag, among the plurality of user tags 7a and 7b registered in the use result information 8. Next, the charge calculation apparatus 5 calculates the charge billed to the charge calculation target organization by using a result obtained by multiplying the acquired usage of the resource by the unit price information corresponding to the unit price code included in the acquired user tag.

There are cases in which the organizations 1 and 2 are charged for management of the user tag addition apparatus 3 and the charge calculation apparatus 5. In this case, the charge calculation apparatus 5 calculates the total charge billed to the organization group as a whole based on the acquired use result information 8 and the management charge. Next, the charge calculation apparatus 5 calculates the amount billed to each organization based on the total charge and the charge calculated for each organization. For example, the charge calculation apparatus 5 divides the total charge by the plurality of organizations based on the charges for the provision services provided to the plurality of organizations 1 and 2 and determines the results obtained by the division to be the amounts billed to the plurality of organizations. In the example in FIG. 1, of the total charge for the use of the provision services 4a and 4b, the charge billed to the organization 1 is calculated by a rate expressed by "T1×W1/(T1×W1+T2×W2)". By multiplying this rate by the total charge, the charge billed to the organization 1 is calculated. Similarly, of the total charge for the use of the provision services 4a and 4b, the charge billed to the organization 2 is calculated by a rate expressed "T2×W2/(T1×W1+T2×W2)". By multiplying this rate by the total charge, the charge billed to the organization 2 is calculated.

When the service execution apparatus 4 starts provision of a new service or for other reasons, there may be a case where the unit price management table 5a does not include a unit price code corresponding to the provision services 4a and 4b executed based on a service use request. In this case, the user tag addition apparatus 3 generates a temporary unit price code and includes the generated temporary unit price code in a user tag. When a user tag includes a temporary unit price code, the charge calculation apparatus 5 uses, as the unit price corresponding to the temporary unit price code, a given unit price determined in advance for a resource whose usage is associated with the user tag including the temporary unit price code. For example, the given unit price is provided by the service execution apparatus 4.

After determining the charges billed to the organizations 1 and 2, the charge calculation apparatus 5 bills the organizations 1 and 2 the respective charges. For example, the charge calculation apparatus 5 transmits billing data indicating the charges (including the charges for the provision services) billed to the respective organizations 1 and 2 to billing processing systems 1b and 2b that manage payment of the charges billed to the respective organizations 1 and 2. The charge calculation apparatus 5 may access servers of financial organizations and withdraw the charges from the relevant accounts of the respective organizations 1 and 2.

As described above, appropriate charges are calculated based on the usages of the services provided to the organizations 1 and 2. Namely, since a service provider that provides services by using the service execution apparatus 4 charges organizations as a single user based on the usages of the services provided to the organizations, it is impossible to determine which organization has used which service to what extent from a bill. In addition, if the use result information acquired from the service execution apparatus 4 does not include information about the user tags 7a and 7b, it is impossible to determine which organization has used which resources.

In the first embodiment, when the organization 1 or 2 uses services, organization codes and unit price codes are included in user tags 7a and 7b added to resources used for execution of the services. Information about the user tags 7a and 7b associated with the resources may be acquired from the service execution apparatus 4 as the use result information 8 about the resources. Since organization codes are indicated in association with resource usages in the use result information 8, it is possible to determine which organizations have used the target resources to what extent. In addition, since unit price codes are associated with resource usages in the use result information 8, it is possible to determine the unit prices of the target resources.

Even when resources have the same size (for example, virtual machines having the same number of processors or the same amount of memory), the unit prices are different depending on the contract. For example, there are cases in which the unit price of a resource included in a basic system is low and the unit price of an additional resource added for reinforcement in size is high. By associating a unit price code with a resource when the resource is used, it is possible to determine under which unit price the resource has been used. Thus, the usages of the resources provided to the organizations 1 and 2 and the unit prices of the resources used are accurately determined. As a result, appropriate charges are calculated.

By negotiating with the service provider of the service execution apparatus 4 (clouds), a group (for example, a company group) formed by the organizations 1 and 2 as a whole may receive a discount on the usages of the services. When the charge calculation apparatus 5 according to the first embodiment is not used, no discount information is included in billing data that an individual user acquires by referring to a portal site of an individual cloud. Thus, a department that performs cloud contract management, billing, and operations for an individual company/company group has trouble in adjusting the charges. In contrast, for example, since the charge calculation apparatus 5 according to the first embodiment calculates the charges billed to the organizations 1 and 2 after a discount is applied, accurate charges on which a discount has been reflected are calculated. In this way, charges on which a discount has been reflected are calculated.

In addition, there are many service providers that provide cloud services. There are cases in which the group to which the plurality of organizations 1 and 2 belong uses a plurality of cloud services depending on the purposes, characteristics, and charges. In these cases, a plurality of service providers that provide clouds offer billing data aggregation methods using their own portal sites or APIs (Application Programming Interfaces). By using the charge calculation apparatus 5 according to the first embodiment, the charges from the plurality of service providers are divided automatically and appropriately for the plurality of organizations 1 and 2. Namely, according to the first embodiment, a unit price code and an organization code as a user tag are added to resources (a cloud environment such as virtual machines and disks) used by an individual one of the plurality of organizations 1 and 2. In this way, for example, by setting a unit price code and unit price information for each service of a plurality of clouds in the unit price management table 5a of the charge calculation apparatus 5, the services of the plurality of clouds are managed integrally. For example, there are cases in which the same unit price is set for services provided by different clouds. In these cases, by assigning the same unit price code, it is possible to calculate the charge for each resource group, not the service menus provided by the service providers.

The charges billed to the respective organizations 1 and 2 may be calculated, for example, by using calculation expressions in which individual circumstances such as business-to-business transactions are taken into consideration. For example, a template defining a charge calculation method may be prepared for each cloud service provider, and the charge calculation apparatus 5 may calculate the charges billed to the respective organizations 1 and 2 in accordance with the respective templates. In this way, it is possible to calculate the individual charges in view of the circumstances of the respective service providers.

For example, when a company group or the like has restructured its constituent organizations, by changing the organization codes set in the user tags and aggregating data, this restructure is easily managed.

Second Embodiment

Next, a second embodiment will be described. In the second embodiment, when the cloud charge billed to a company group is divided by the organizations belonging to the company group, an individual organization is charged an appropriate charge based on its cloud usage.

Figure 2:
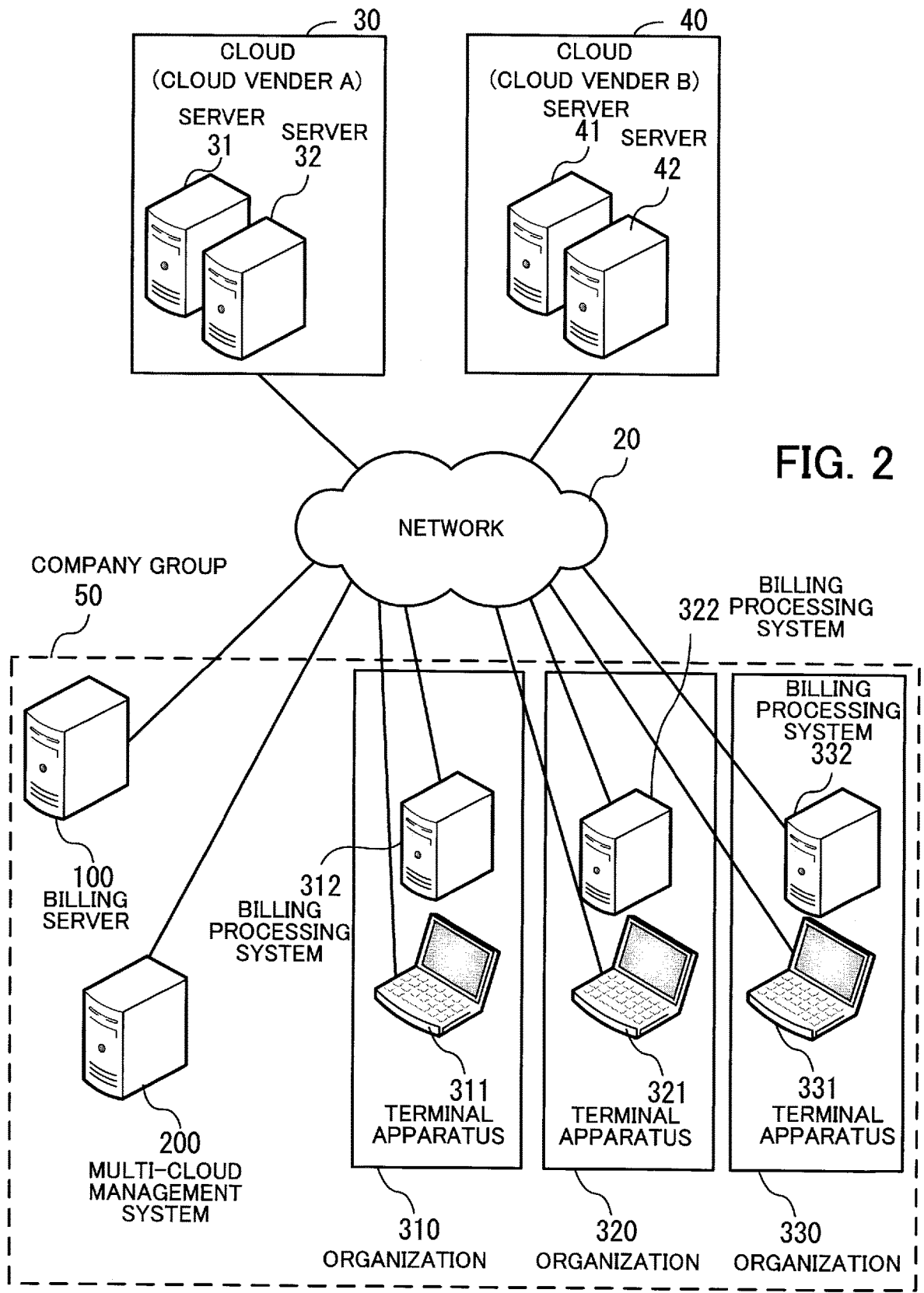
FIG. 2 illustrates a configuration example of a system according to a second embodiment.

FIG. 2 illustrates a configuration example of a system according to the second embodiment. Clouds 30 and 40 provide services via a network 20. The cloud 30 is a system provided by a cloud vender A. The cloud 30 includes a plurality of servers 31 and 32. The plurality of servers 31 and 32 are computers that generate, for example, virtual machines by using hypervisors and provide users with environments in which virtual machines are used. Likewise, the cloud 40 includes a plurality of servers 41 and 42 that provide services. The cloud 40 is a system provided by a cloud vender B.

The network 20 is also connected to a billing server 100, a multi-cloud management system 200, terminal apparatuses 311, 321, and 331, and billing processing systems 312, 322, and 332. The billing server 100, the multi-cloud management system 200, the terminal apparatuses 311, 321, and 331, and the billing processing systems 312, 322, and 332 are computers managed by a company group 50 that uses services of the clouds 30 and 40. The terminal apparatuses 311, 321, and 331 are used by organizations 310, 320, and 330 that belong to the company group 50, respectively. Each of the billing processing systems 312, 322, and 332 is a computer that performs charge payment processing based on a bill. While the multi-cloud management system 200 is arranged in the company group 50 in FIG. 2, the multi-cloud management system 200 may be arranged in each of the clouds 30 and 40.

The billing server 100 performs cloud charge billing processing for the organizations 310, 320, and 330 belonging to the company group 50. The multi-cloud management system 200 is an information processing system that performs processing on introduction, operation, and management of clouds. Specifically, the multi-cloud management system 200 performs processing for assisting management of organizations, users, etc. In addition, the multi-cloud management system 200 assists the clouds 30 and 40 with resource (virtual machine) creation processing so that the terminal apparatuses 311, 321, and 331 are able to use services of the clouds 30 and 40.

The terminal apparatus 311 is provided with services by the clouds 30 and 40 in accordance with instructions from users who belong to the organization 310. The terminal apparatus 321 is provided with services by the clouds 30 and 40 in accordance with instructions from users who belong to the organization 320. The terminal apparatus 331 is provided with services by the clouds 30 and 40 in accordance with instructions from users who belong to the organization 330.

Figure 3:
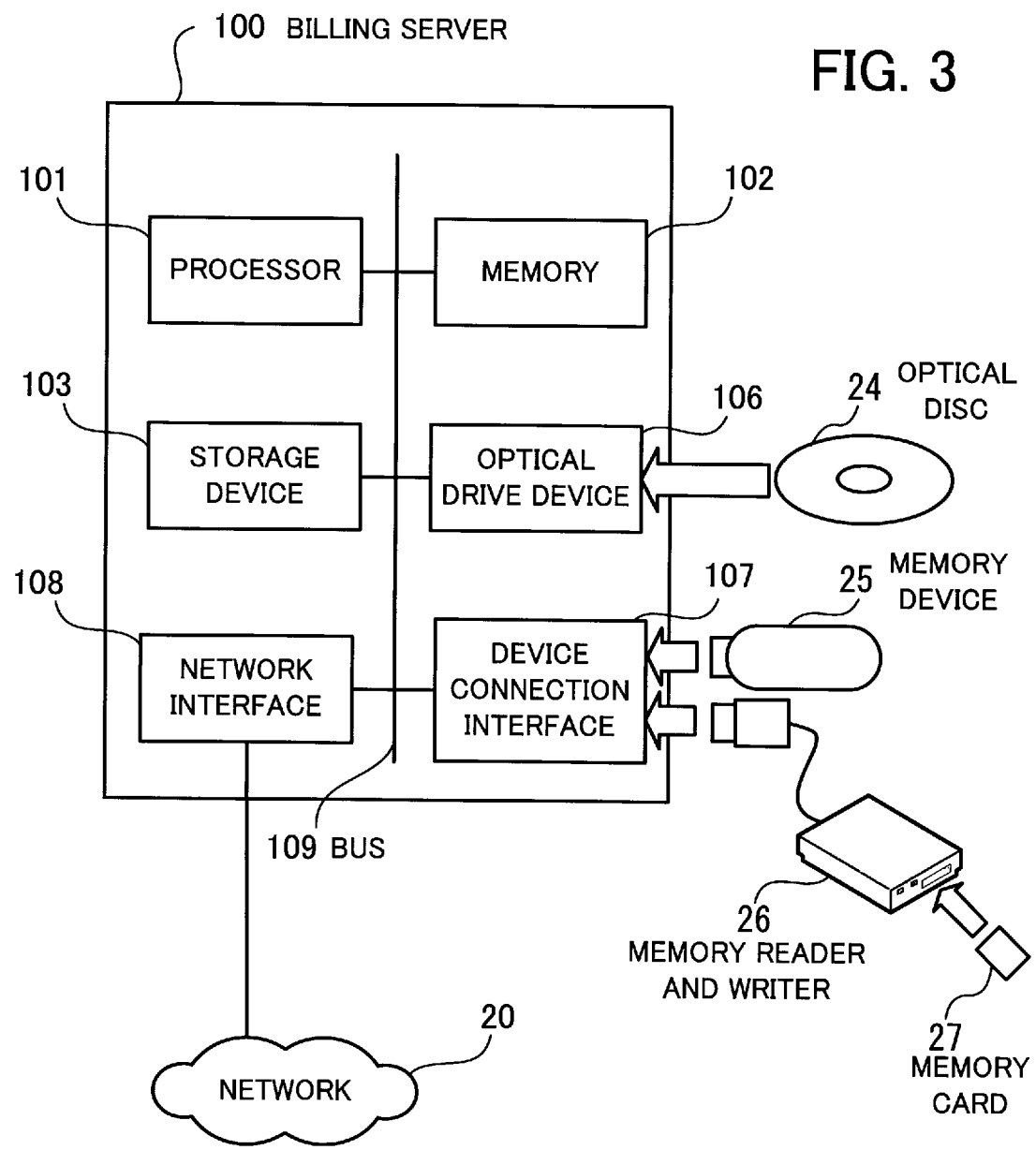
FIG. 3 illustrates a hardware configuration example of a billing server.

FIG. 3 illustrates a hardware configuration example of the billing server 100. The billing server 100 is comprehensively controlled by a processor 101. The processor 101 is connected to a memory 102 and a plurality of peripheral devices via a bus 109. The processor 101 may be a multiprocessor. The processor 101 is a central processing unit (CPU), a micro processing unit (MPU), or a digital signal processor (DSP). At least a part of the functions realized when the processor 101 executes a program may be realized by using an electronic circuit such as an application specific integrated circuit (ASIC) or a programmable logic device (PLD).

The memory 102 is used as a main storage device of the billing server 100. The memory 102 temporarily holds at least a part of an operating system (OS) program or an application program executed by the processor 101. In addition, the memory 102 holds various kinds of data used for processing performed by the processor 101. For example, a volatile semiconductor storage device such as a random access memory (RAM) is used as the memory 102.

Examples of the peripheral devices connected to the bus 109 include a storage device 103, an optical drive device 106, a device connection interface 107, and a network interface 108.

The storage device 103 electrically or magnetically writes and reads data on its internal storage medium. The storage device 103 is used as an auxiliary storage device of the computer. The storage device 103 holds an OS program, an application program, and various kinds of data. For example, a hard disk drive (HDD) or a solid state drive (SSD) may be used as the storage device 103.

The optical drive device 106 reads data stored on an optical disc 24 by using laser light or the like. The optical disc 24 is a portable storage medium holding data that is readable by light reflection. Examples of the optical disc 24 include a digital versatile disc (DVD), a DVD-RAM, a compact disc read-only memory (CD-ROM), and a CD-Recordable (R)/ReWritable (RW).

The device connection interface 107 is a communication interface for connecting peripheral devices to the billing server 100. For example, a memory device 25 or a memory reader and writer 26 may be connected to the device connection interface 107. The memory device 25 is a storage medium capable of communicating with the device connection interface 107. The memory reader and writer 26 is capable of reading and writing data on a memory card 27. The memory card 27 is a card-type storage medium.

The network interface 108 is connected to the network 20. The network interface 108 exchanges data with other computers or communication devices via the network 20.

The processing functions of the billing server 100 may be realized by the above hardware configuration. The multi-cloud management system 200 or the terminal apparatus 311, 321, or 331 may also be realized by a hardware configuration equivalent to that of the billing server 100. The user tag addition apparatus 3, the service execution apparatus 4, or the charge calculation apparatus 5 according to the first embodiment may also be realized by a hardware configuration equivalent to that of the billing server 100 illustrated in FIG. 3.

The billing server 100 realizes processing functions according to the second embodiment by executing a program stored in a computer-readable storage medium, for example. A program in which the processing content executed by the billing server 100 is described may be stored in any one of various storage media. For example, the program executed by the billing server 100 may be stored in the storage device 103. The processor 101 loads at least a part of the program in the storage device 103 to the memory 102 and executes the program. Alternatively, the program executed by the billing server 100 may be stored in a portable storage medium such as the optical disc 24, the memory device 25, or the memory card 27. The program stored in the portable storage medium is installed on the storage device 103, for example, by the processor 101 and is made executable. The processor 101 may directly read the program from the portable storage medium and execute the read program.

Figure 4:
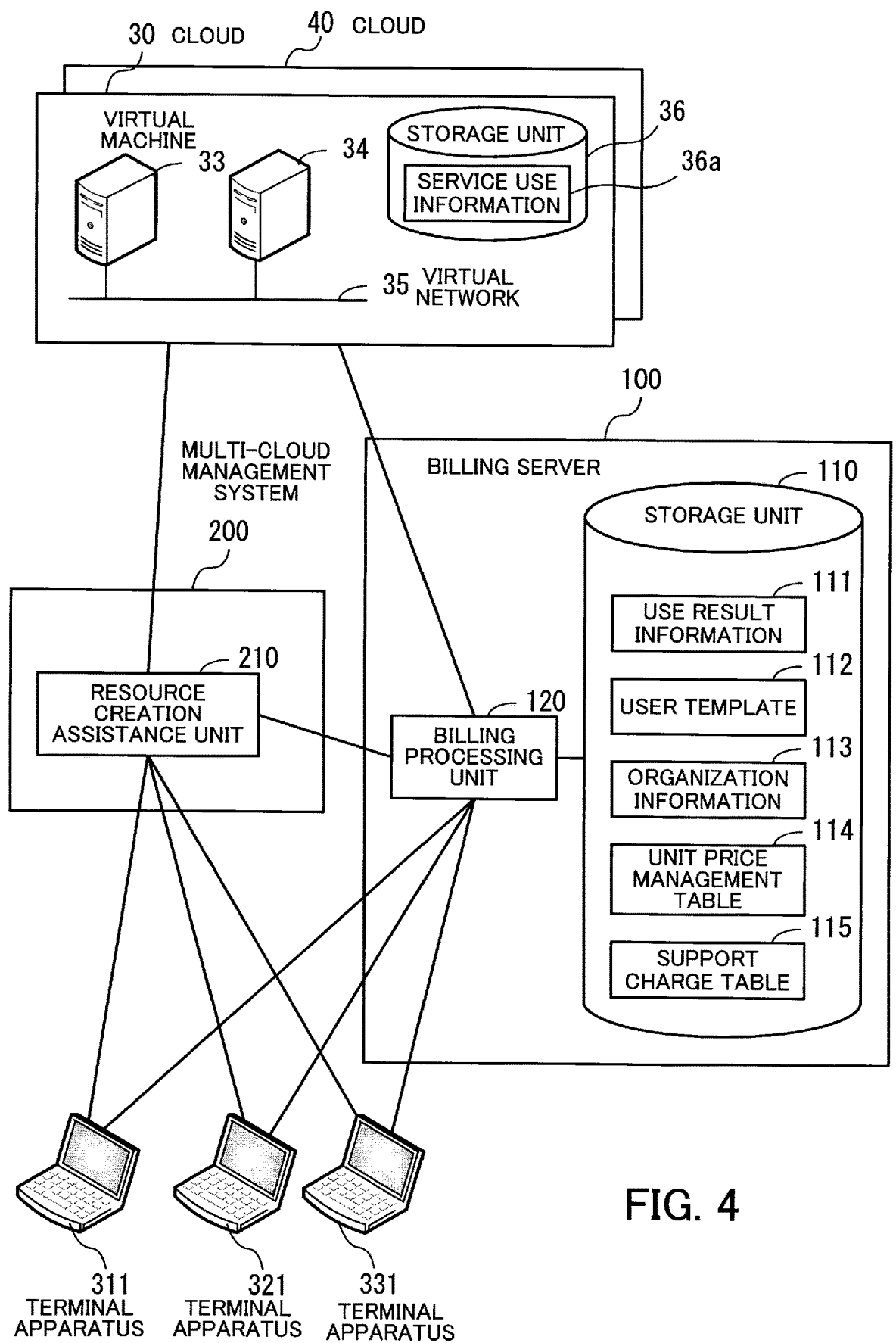
FIG. 4 is a block diagram illustrating functional examples of individual apparatuses.

FIG. 4 is a block diagram illustrating functional examples of individual apparatuses. The billing server 100 includes a storage unit 110 and a billing processing unit 120. The storage unit 110 is realized by the memory 102 or the storage device 103 of the billing server 100, for example. The billing processing unit 120 is realized by the processor 101 of the billing server 100, for example.

The multi-cloud management system 200 includes a resource creation assistance unit 210. The resource creation assistance unit 210 transmits requests for creating resources such as virtual machines to the clouds 30 and 40 in response to requests from the terminal apparatuses 311, 321, and 331. When transmitting a resource creation request, the resource creation assistance unit 210 adds a user tag about a resource to be created to the resource creation request. This user tag includes an identifier of the organization using the resource and a unit price code of the resource to be used.

For example, virtual machines 33 and 34 and a virtual network 35 are established in the cloud 30 in response to a resource creation request from the multi-cloud management system 200. Each of the virtual machines 33 and 34 and the virtual network 35 is an individual resource used by a corresponding user. The cloud 30 includes a storage unit 36 including service use information 36a. In the service use information 36a, resources are associated with user tags presented when the resources have been created. When a single charge is billed to the company group 50 for use of the cloud 30, the cloud 30 creates use result information. The use result information includes, for example, the resources that have been used, the charges of the respective resources, and the user tags corresponding to the resources. The cloud 30 stores the created use result information in a storage area such as a database, and the billing server 100 acquires this use result information 111 by using an API.

The storage unit 110 includes the use result information 111, a user template 112, organization information 113, a unit price management table 114, and a support charge table 115. The use result information 111 is information that indicates usage for each service of the clouds 30 and 40. The user template 112 is a template of a bill indicating the charge for any one of the clouds 30 and 40. The template is created for each organization. The organization information 113 is information about the organizations of the company group 50. The unit price management table 114 is information indicating unit prices for the services provided by the clouds 30 and 40. The support charge table 115 is information indicating support charges such as for charge management of the clouds 30 and 40, the support charges billed to each of the organizations 310, 320, and 330 belonging to the company group 50.

The billing processing unit 120 calculates the charges billed to the respective organizations 310, 320, and 330 based on the usages of the services provided by the clouds 30 and 40 to the respective organizations 310, 320, and 330. Next, the billing processing unit 120 bills the organizations 310, 320, and 330 their respective charges calculated. The billing processing unit 120 has a function of coordinating data with the resource creation assistance unit 210 in the multi-cloud management system 200. By using the data coordination function, the billing processing unit 120 provides the resource creation assistance unit 210 with the organization information 113 and the unit price management table 114.

The function of an individual element illustrated in FIG. 4 may be realized, for example, by causing a computer to execute a program module corresponding to the individual element.

Hereinafter, data stored in the storage unit 110 will be described in detail with reference to FIGS. 5 to 10.

Figure 5:
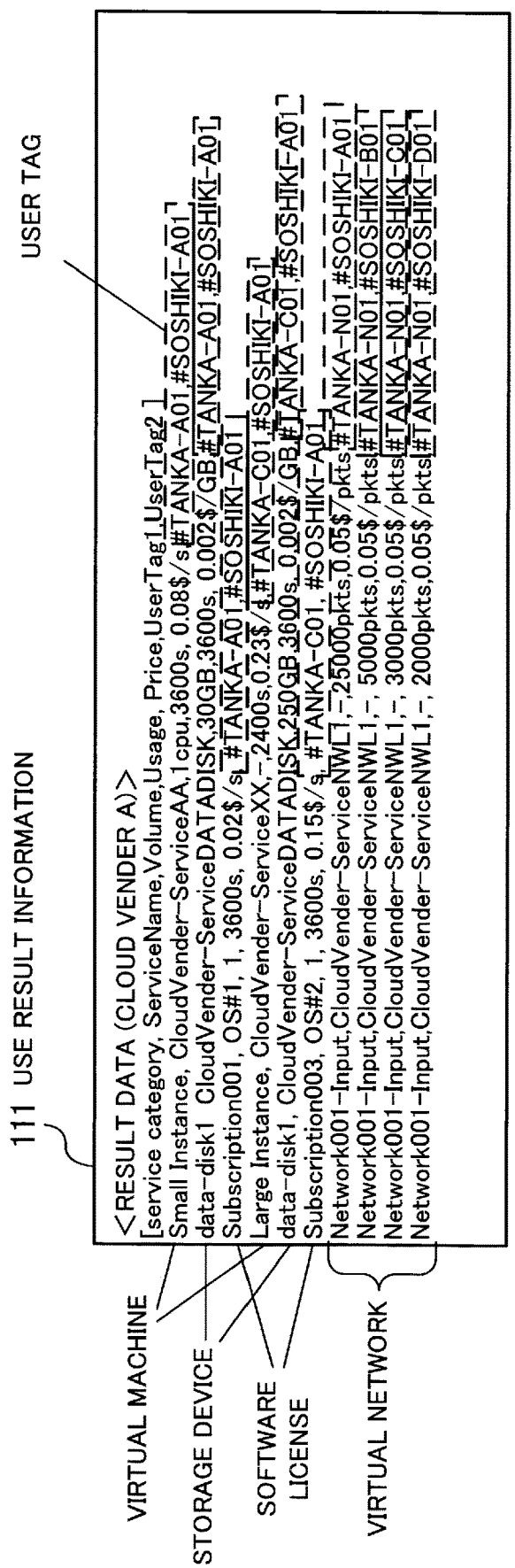
FIG. 5 illustrates an example of use result information.

FIG. 5 illustrates an example of the use result information 111. The use result information 111 includes a record for each resource that has been used. Each record includes a service category, a service name, a resource volume that has been used, a usage, a unit price, and a user tag. Each of the unit prices in the use result information 111 is a standard unit price per unit time for use of a resource (a price without a discount).

In the example in FIG. 5, each user tag is indicated by a dashed line frame. Examples of the resources provided by the clouds 30 and 40 include virtual machines, storage devices, software licenses, and virtual networks, and records corresponding to these resources are included in the use result information 111. For example, a set of resources such as a combination of a CPU and a memory and a combination of software licenses may be treated as a single billing target resource.

An individual user tag includes a unit price code (for example, "TANKA-A01") and an organization code (for example, "SOSHIKI-A01"), which is an organization identifier. For example, each of the clouds 30 and 40 provides a service as a set of a virtual machine and a software license. In this case, a single unit price table exists for the service. Thus, the records for the resources provided as a set by a single service include the same unit price code.

FIG. 6 illustrates an example of the user template 112. In the user template 112, a currency rate to be applied, a method for calculating the usage rate of an individual user for each service, a content displayed on a bill, etc. are defined.

FIG. 7 illustrates an example of the organization information 113. The organization information 113 includes an organization code table 133a and a user information table 133b.

In the organization code table 133a, an organization name (for example, "company A") and its organization code that are associated with each other are set. When a single organization (a parent organization) includes a plurality of organizations (child organizations) and when each child organization is charged for use of a cloud, the organization code of each of the child organizations is set in association with the name of the single parent organization in the organization code table 133a.

The user information table 133b is a data table for managing information about the users of the clouds 30 and 40. For example, in an entry in the user information table 133b, a user ID and a password are set in association with the organization code of the corresponding organization.

FIG. 8 illustrates a first example of the unit price management table 114. In an entry in the unit price management table 114, a combination of a unit price code, an item name, and a unit price is registered. In addition, in association with this combination, a list of resources included in a service that is provided by a cloud vender and that corresponds to the unit price code is registered. A single record registered in the unit price management table 114 is a single unit price table.

Even when cloud venders provide services corresponding to the same unit price code "TANKA-A01", each cloud vender has a different resource configuration used for its service provision. For example, in the case of the unit price code "TANKA-A01", the unit price applied when a service whose item name "basic virtual machine template A01 (minimum configuration)" is used is "¥18.3" per hour. The resource amount assigned for provision of this service by a "cloud vender α" is as follows: the hardware resources are "1 CPU, a 3.5 GB memory, a 30 GB HDD"; and the software resources are "subscription of OS #1". This "subscription" is a billing method in which an organization is charged based on a period for which the organization has used software. The resource amount assigned by a "cloud vender β" for provision of this service is as follows: the hardware resources are "1 CPU, a 2.0 GB memory, and a 25 GB HDD"; and the software resources are "subscription of OS #1".

Cloud venders start provision of new services by using clouds, as needed. Thus, among the services provided via the clouds, there could be some services whose unit price tables are not registered in the unit price management table 114. An organization may use a service whose unit price table is not registered. In this case, a record in which a temporary unit price code is set as the unit price code is registered in the unit price management table 114.

FIG. 9 illustrates a second example of the unit price management table 114. Unit price codes "TANKA-XX1" and "TANKA-XX2" in the unit price management table 114 illustrated in FIG. 9 are temporary codes. A record in which a temporary unit price code is set is registered in the unit price management table 114 when an organization uses a service whose unit price table is not registered in the unit price management table 114. When the record is registered, only the temporary unit price code is set therein. When use result information including the temporary unit price code is subsequently transmitted from a cloud vender, an item name and a unit price are set in the record in which the temporary unit price code is set in the unit price management table 114. The unit price set at this point is the unit price indicated in the use result information, for example. Next, for example, a bill for this month is created by using the temporary unit price code. Subsequently, processing for correcting the temporary unit price code is performed, and the bills for the subsequent months are processed by using a proper unit price code associated with the template.

FIG. 10 illustrates an example of the support charge table 115. The support charge table 115 includes columns "support service code", "item name", and "unit price". In an individual entry under the column "support service code", an identifier (a support service code) identifying the content of a corresponding support service is set. In an individual entry under the column "item name", the name of a corresponding service item provided as a support service is set. In addition, in an individual entry under the column "item name", a restriction on the support of a corresponding service item may be set. For example, regarding a service item "basic monitoring of virtual machines", the maximum number of monitoring target virtual machines is set. In an individual entry under the column "unit price", the monthly charge for a corresponding support service is set.

Next, service use information stored in clouds 30 and 40 will be described in detail with reference to FIG. 11.

FIG. 11 illustrates an example of service use information 36a. The service use information 36a includes columns "item name", "resource", "user tag", and "usage". In an individual entry under the column "item name", the item name of a service used by an organization belonging to a group that has made a comprehensive contract is set. In an individual entry under the column "resource", the amount of resources used for provision of a service item used is set. In an individual entry under the column "user tag", a user tag associated with a corresponding service by a corresponding user is set. In an individual entry under the column "usage", the usage of a corresponding service is set.

With this system having the above configuration, when a cloud service provider collectively bills a charge to the group formed by the plurality of organizations 310, 320, and 330, each of the organizations 310, 320, and 330 is charged an appropriate charge.

Figure 12:
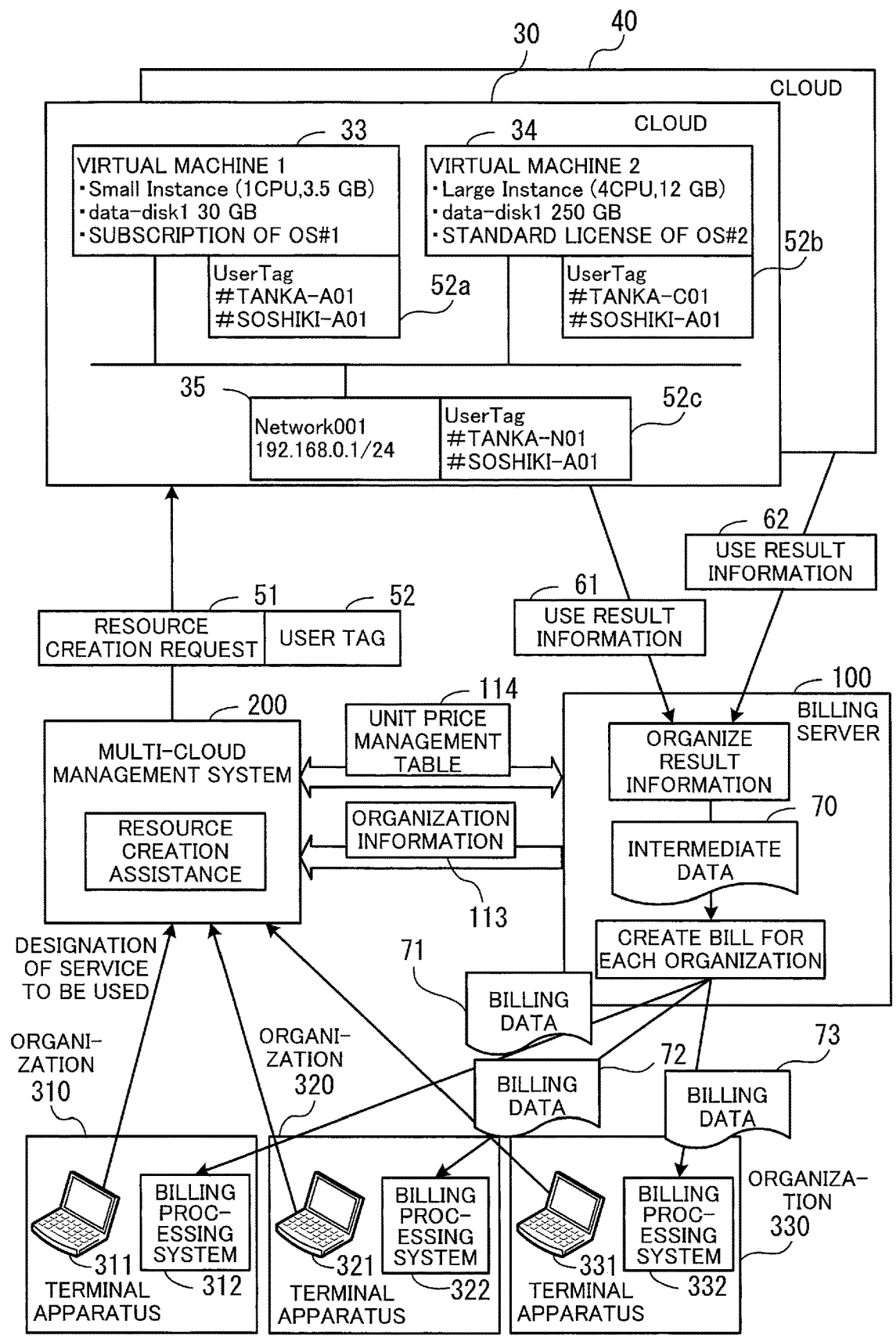
FIG. 12 illustrates an operation example of the system.

FIG. 12 illustrates an operation example of the system. When the plurality of organizations 310, 320, and 330 use services of the clouds 30 and 40, the organizations 310, 320, and 330 use their respective terminal apparatuses 311, 321, and 331 to access the multi-cloud management system 200 and designate services to be used.

When a service to be used is designated, the multi-cloud management system 200 performs resource creation assistance processing. For example, the multi-cloud management system 200 acquires the organization information 113 and the unit price management table 114 from the billing server 100. Next, the multi-cloud management system 200 transmits a resource creation request 51 to the cloud (for example, the cloud 30) determined by the designation of the service to be used. A user tag 52 is added to the resource creation request 51 to be transmitted.

After receiving the resource creation request 51, for example, the cloud 30 causes a server managing resources to generate a virtual resource based on the resource creation request 51. In the example in FIG. 12, the virtual machines 33 and 34, the virtual network 35, etc. have been generated. The generated virtual resources are associated with user tags 52a, 52b, and 52c added at the time of the creation of the resource creation request.

The plurality of organizations 310, 320, and 330 use their respective terminal apparatuses 311, 321, and 331 to use resources provided by the clouds 30 and 40. Each of the service providers of the clouds 30 and 40 bills the group, to which the plurality of organizations 310, 320, and 330 belong, a charge for use of the services, every month, for example.

At the time of billing, the billing server 100 acquires use result information 61 and 62 from the respective clouds 30 and 40. The billing server 100 performs organization-by-organization result aggregation processing. In this organization-by-organization result aggregate processing, for example, the billing server 100 organizes the result information and generates intermediate data 70. Next, the billing server 100 creates billing data 71 to 73 for each organization based on the generated intermediate data 70. The billing data 71 to 73 may be included in a bill, for example. Next, the billing server 100 transmits the billing data 71 to 73 to billing processing systems 312, 322, and 332 of the organizations 310, 320, and 330, respectively. Next, the billing processing systems 312, 322, and 332 performs processing on the charges indicated by the billing data 71 to 73.

FIG. 13 illustrates an example of the intermediate data 70. An individual record in the intermediate data 70 includes an organization code, a unit price code, an item name, a usage, a price (a net price), a discount, and a support charge. The records in the intermediate data 70 are sorted according to the organization codes. The records having the same organization code in the intermediate data are sorted according to the unit price codes.

Based on the intermediate data 70, the billing processing unit 120 is able to calculate the charges billed to the respective organizations. For example, the billing processing unit 120 divides the charges billed by the service providers of the clouds 30 and 40 based on the usages of the services provided to the organizations and determines the results to be the charges billed to the respective organizations.

When calculating the charges based on the usages of the services provided to the organizations, first, the billing processing unit 120 extracts, from the intermediate data 70, records having the same resource used and the same unit price code. For example, a case in which the following records are included in the intermediate data 70 as virtual network use results will be described.
SOSHIKI-A01,# TANKA-N01,CloudVender-Service-NWL1,25000pkts, 0.05$/pkts
SOSHIKI-B01,# TANKA-N01,CloudVender-Service-NWL1,5000pkts, 0.05$/pkts
SOSHIKI-001,# TANKA-N01,CloudVender-Service-NWL1,3000pkts, 0.05$/pkts
SOSHIKI-D01,# TANKA-N01,CloudVender-Service-NWL1,2000pkts, 0.05$/pkts These four records represent the virtual network use results of four organizations. In this case, the rate of the charge for the virtual network billed to an organization is obtained by dividing the charge based on the usage by this organization by the total charge based on the usages by all the organizations. Specifically, the rate of the charge for the virtual network billed to an individual organization is calculated as follows.
SOSHIKI-A01=25000*0.05/(25000*0.05+5000*0.05+3000*0.05+2000*0.05)=0.71428
SOSHIKI-B01=5000*0.05/(25000*0.05+5000*0.05+3000*0.05+2000*0.05)=0.14285
SOSHIKI-001=3000*0.05/(25000*0.05+5000*0.05+3000*0.05+2000*0.05)=0.08571
SOSHIKI-D01=2000*0.05/(25000*0.05+5000*0.05+3000*0.05+2000*0.05)=0.05714

When "CloudVender-ServiceNWL1" is a service provided by the cloud 30, the service provider of the cloud 30 bills a single charge for the virtual network. The billing processing unit 120 divides this single charge based on the rates of the respective organizations. When the charge for the virtual network is "W", for example, the price (net price) billed to the organization "SOSHIKI-A01" is "0.71428×W".

The billing processing unit 120 proportionally divides the support charge for performing billing management of the charges by using the billing server 100 based on the resource charge for each organization. For example, a case in which the following records are included in the intermediate data 70 as the resource use results will be described.
SOSHIKI-A01,# TANKA-A01,CloudVender-ServiceAA, 3600s,0.08$/s,
SOSHIKI-A01,# TANKA-A01,CloudVender-Service-DATADISK,3600s*50,0.002$/s,
SOSHIKI-A01,# TANKA-N01,CloudVender-Service-NWL1, 25000pkts, 0.05$/pkts,
SOSHIKI-B01,# TANKA-A01,CloudVender-ServiceAA, 2400s,0.23$/s,
SOSHIKI-B01,# TANKA-A01,CloudVender-Service-DATADISK,3600s*250,0.002$/s,
SOSHIKI-B01,# TANKA-N01,CloudVender-Service-NWL1,5000pkts, 0.05$/pkts, These records represent resource use results of two organizations. In this case, the rate of the support charge of an organization is obtained by dividing the charge based on the resource usage of this organization by the total charge based on the usages of all the organizations. Specifically, the rate of the support charge billed to an individual organization is calculated as follows.
SOSHIKI-A01=(3600*0.08+3600*50*0.002+25000*0.05)/(3600*0.08+3600*50*0.002+25000*0.05+2400*0.23+3600*250*0.002+5000*0.05)=0.42
SOSHIKI-B01 (2400*0.23+3600*250*0.002+5000*0.05)/(3600*0.08+3600*50*0.002+25000*0.05+2400*0.23+3600*250*0.002+5000*0.05)=0.58

In this example, when the total support charge is "U", for example, the price (net price) of the support charge billed to the organization "SOSHIKI-A01" is "0.42×U".

The calculation of the price (net price) is performed for each organization and unit price code. By multiplying the calculated price by a value based on a discount rate, the price (selling price) that the organization is charged is obtained. For example, if the discount rate is "15%", the price (net price) is multiplied by 0.85, and the price (selling price) is obtained.

Next, the billing processing unit 120 adds up the price (selling price) for each unit price code for each organization to obtain the charge to be billed to the organization.

FIG. 14 illustrates an example of the billing data 71. The billing data 71 includes information about the charge billed to a certain organization. For example, the billing data 71 indicates the cloud service discount rate, the support charge rate applied to the corresponding organization (support charge rate), the rate at which the network is used by the organization (network use rate), and detailed information. The detailed information indicates an organization code, a unit price code, an item name, a usage, a price (net price), and a price (selling price) for each service used by the corresponding organization.

Next, the resource creation assistance processing performed by the multi-cloud management system 200 will be described in detail.

Figure 15:
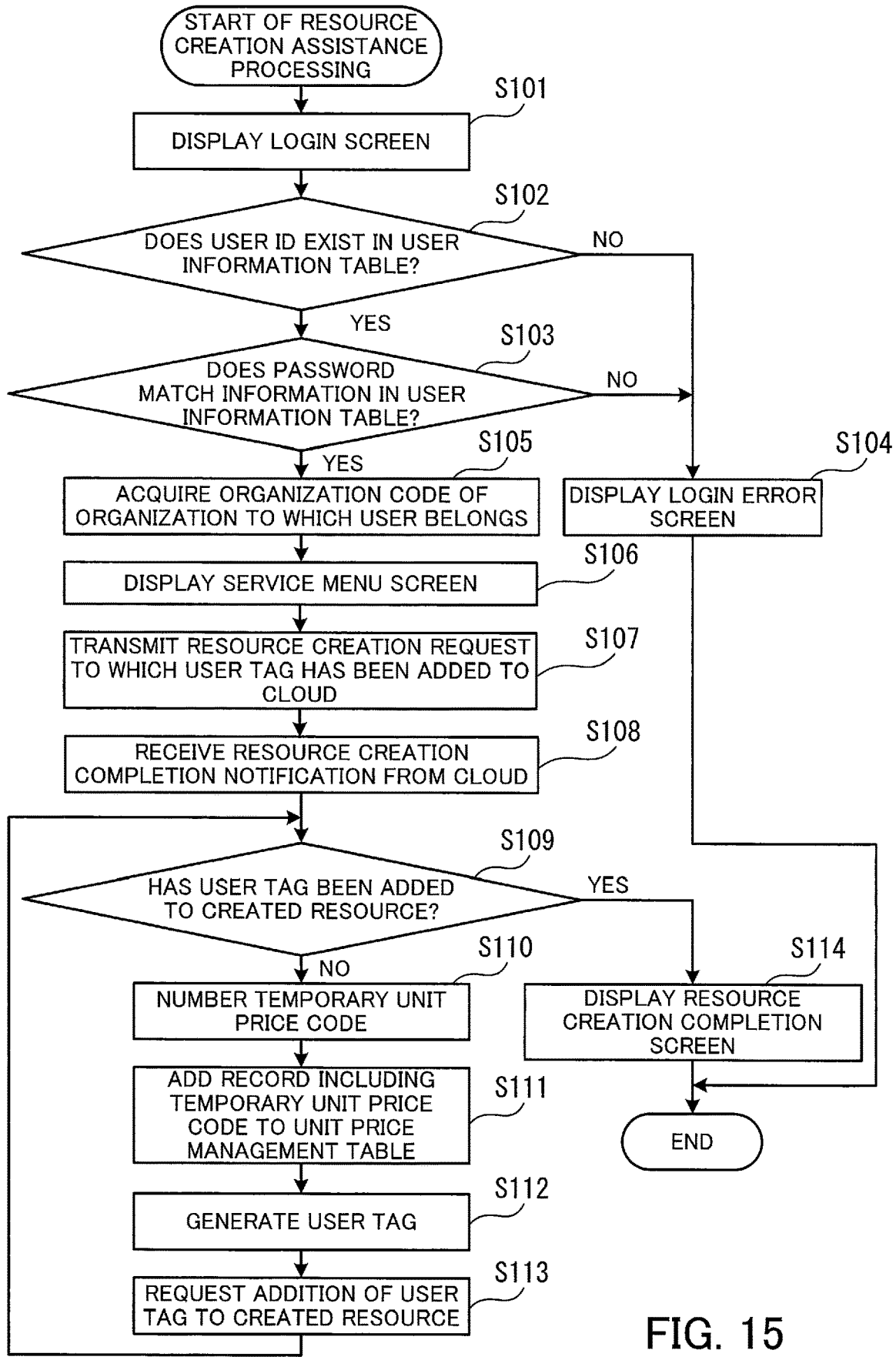
FIG. 15 is a flowchart illustrating an example of a procedure of resource creation assistance processing.

FIG. 15 is a flowchart illustrating an example of a procedure of the resource creation assistance processing. Hereinafter, the processing illustrated in FIG. 15 will be described step by step by using an example in which the terminal apparatus 311 designates a service to be used and resources are accordingly created in the cloud 30.

[Step S101] The resource creation assistance unit 210 of the multi-cloud management system 200 displays a login screen on a monitor of the terminal apparatus 311. For example, when accessed by the terminal apparatus 311, the resource creation assistance unit 210 transmits HyperText Markup Language (HTML) format data indicating a login screen to the terminal apparatus 311. For example, the login screen includes an input area for a user ID and a password. When a user who belongs to the organization 310 inputs a user ID and a password to the terminal apparatus 311, authentication information including the user ID and the password is transmitted from the terminal apparatus 311 to the multi-cloud management system 200.

[Step S102] When the resource creation assistance unit 210 receives the authentication information from the terminal apparatus 311, the resource creation assistance unit 210 determines whether the user ID included in the authentication information exists in the user information table 133b. If the user ID exists, the processing proceeds to step S103. If the user ID does not exist, the processing proceeds to step S104.

[Step S103] The resource creation assistance unit 210 determines whether the password included in the authentication information matches the password registered in association with the user ID included in the authentication information in the user information table 133b. If the password matches, the processing proceeds to step S105. If the password does not match, the processing proceeds to step S104.

[Step S104] The resource creation assistance unit 210 displays a login error screen on the terminal apparatus 311 and ends this resource creation assistance processing.

[Step S105] The resource creation assistance unit 210 acquires the organization code of the organization to which the user belongs from the user information table 133b. For example, the resource creation assistance unit 210 acquires the organization code corresponding to the user ID included in the authentication information received from the terminal apparatus 311 from the user information table 133b.

[Step S106] The resource creation assistance unit 210 displays a service menu screen indicating at least one service allowed to be provided to the organization to which the user using the terminal apparatus 311 belongs on the terminal apparatus 311. The user selects a service to be used on the service menu screen displayed on the terminal apparatus 311. Accordingly, for example, the name of the cloud 30 that provides the service and the item name of the service to be used are transmitted from the terminal apparatus 311 to the multi-cloud management system 200.

[Step S107] The resource creation assistance unit 210 transmits a resource creation request 51 to which a user tag 52 has been added to the cloud 30. The resource creation request 51 includes the name of the resource to be created. The user tag 52 includes the unit price code of the resource to be created and the organization code of the organization to which the user belongs. For example, the resource creation assistance unit 210 acquires the unit price corresponding to the item name inputted by the user from the unit price management table 114. Next, the resource creation assistance unit 210 generates a user tag 52 including the acquired unit price and the organization code acquired in step S105. Next, the resource creation assistance unit 210 transmits a resource creation request 51 to which the generated user tag 52 has been added to the cloud 30.

The user could select a resource whose unit price table does not exist in the unit price management table 114. In this case, for example, the resource creation assistance unit 210 displays an input screen for a unit price code corresponding to the service to be used on the terminal apparatus 311. The user inputs a unit price code that is not registered in the unit price management table 114 to the terminal apparatus 311. The terminal apparatus 311 transmits the inputted unit price code to the multi-cloud management system 200. The resource creation assistance unit 210 of the multi-cloud management system 200 transmits the resource creation request 51 to which the user tag 52 including the unit price code acquired from the terminal apparatus 311 and the organization code has been added to the cloud 30.

There are cases in which the user does not input any unit price code. In these cases, the resource creation assistance unit 210 transmits the resource creation request 51 to the cloud 30 without adding the user tag 52 to the resource creation request 51.

In the cloud 30, a resource such as a virtual machine is created based on the resource creation request 51. When the user tag 52 has been added to the resource creation request 51, the cloud 30 adds the user tag 52 to the created resource. Upon completion of the creation of the resource, the cloud 30 transmits a resource creation completion notification to the multi-cloud management system 200.

[Step S108] The resource creation assistance unit 210 receives the resource creation completion notification from the cloud 30. When there is a created resource to which no user tag has been added, the cloud 30 indicates this absence of the user tag in the resource creation completion notification.

[Step S109] The resource creation assistance unit 210 determines whether there is a created resource to which no user tag has been added. If the resource creation assistance unit 210 has received an identifier of a created resource to which no user tag has been added from the cloud 30, the resource creation assistance unit 210 determines that there is a resource to which no user tag has been added. If there is not a resource to which no user tag has been added, the processing proceeds to step S114. In addition, when there is a resource to which no user tag has been added, the processing proceeds to step S110.

[Step S110] The resource creation assistance unit 210 numbers a temporary unit price code in accordance with a temporary unit price code naming convention. The temporary unit price code naming convention is defined so that temporary unit price codes that can be distinguished from proper unit price codes are generated. For example, when no proper unit price codes include a character "XX" after "TANKA-", a character string including a number after "TANKA-XX" represents a temporary unit price code.

[Step S111] The resource creation assistance unit 210 adds a record in which the temporary unit price code generated in step S110 is set as the unit price code to the unit price management table 114.

[Step S112] The resource creation assistance unit 210 generates a user tag 52. For example, the resource creation assistance unit 210 generates a user tag including the organization code acquired in step S105 and the temporary unit price code numbered in step S110.

[Step S113] The resource creation assistance unit 210 transmits a request for adding the user tag 52 to the created resource to the cloud 30. This request for adding the user tag 52 includes, for example, the service name and the user tag 52 generated in step S112. After receiving the request for adding the tag information, the cloud 30 adds the user tag 52 to the resource corresponding to the service designated by the service name. Next, the processing proceeds to step S109.

[Step S114] The resource creation assistance unit 210 displays a resource creation completion screen on the monitor of the terminal apparatus 311.

In this way, by allowing the multi-cloud management system 200 to mediate a resource creation request, a user tag including the organization code of an organization using a resource created in the cloud 30 and the unit price code of the resource is added to the resource.

As described above, by adding user tags to resources to be used, use result information 61 and 62 including information about the user tags are acquired from the respective clouds 30 and 40. In addition, in the organization-by-organization result aggregation processing, the billing server 100 refers to the use result information 61 and 62 and calculates the charges billed to the respective organizations 310, 320, and 330 based on the usages of the clouds 30 and 40 by the organizations 310, 320, and 330.

The organization-by-organization result aggregation processing is started, for example, at predetermined timing after the use result information 61 and 62 is acquired from the respective clouds 30 and 40. The present embodiment assumes that the acquired use result information 61 and 62 is stored in the storage unit 110.

Next, the organization-by-organization result aggregation processing will be described in detail with reference to FIG. 16. The following example assumes that when a resource for a service whose unit price table is not registered in the unit price management table 114 is created, a record corresponding to a temporary unit price code is not added in the unit price management table 114.

Figure 16:
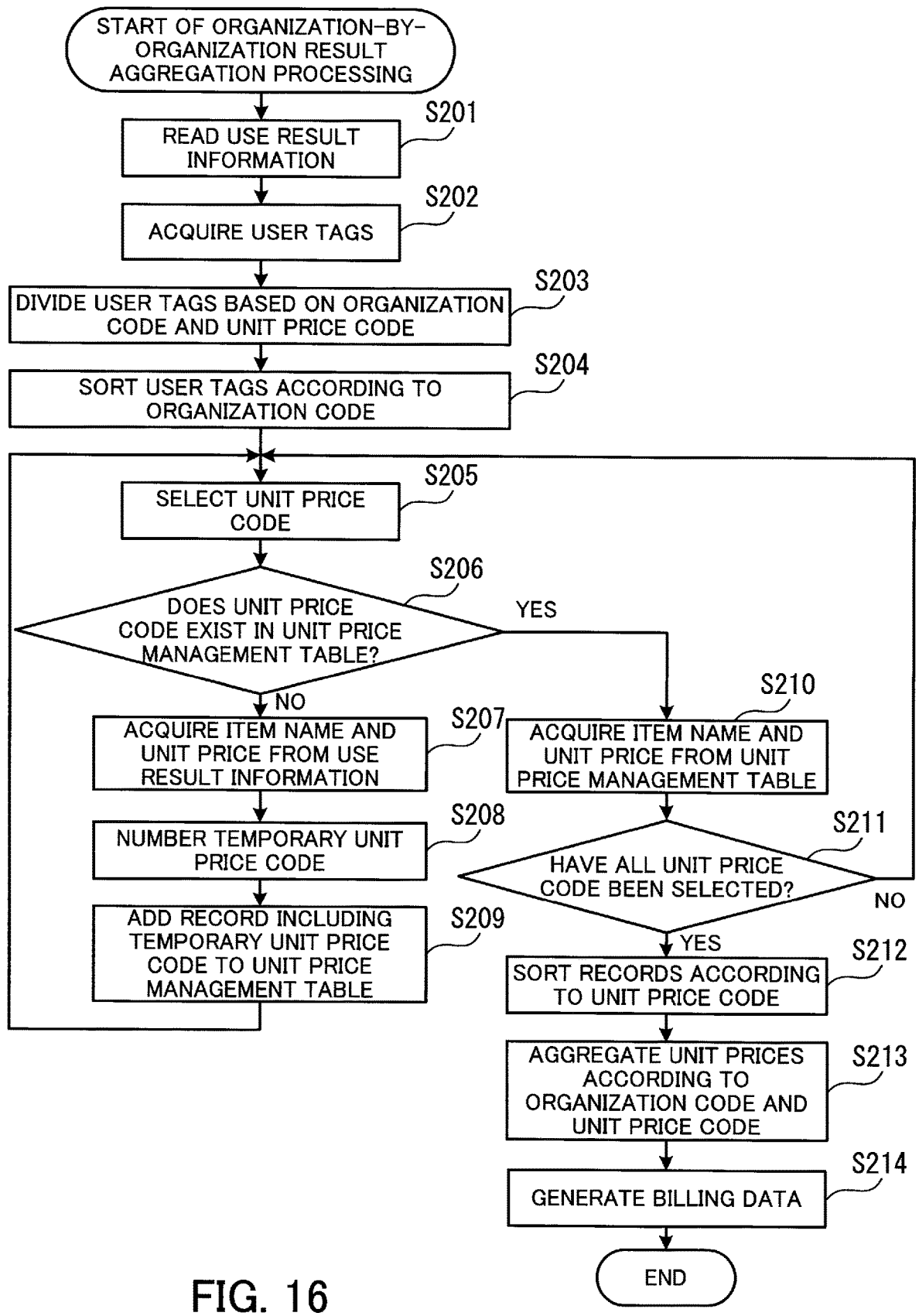
FIG. 16 is a flowchart illustrating an example of a procedure of organization-by-organization result aggregation processing.

FIG. 16 is a flowchart illustrating an example of a procedure of the organization-by-organization result aggregation processing. The processing illustrated in FIG. 16 will be described step by step.

[Step S201] The billing processing unit 120 of the billing server 100 reads the use result information 61 and 62 from the storage unit 110.

[Step S202] The billing processing unit 120 acquires the user tags from the use result information 61 and 62.

[Step S203] The billing processing unit 120 divides the user tags extracted from the use result information 61 and 62 based on the organization codes and unit price codes.

[Step S204] The billing processing unit 120 sorts the list of user tags extracted from the use result information 61 and 62 according to the organization codes.

[Step S205] The billing processing unit 120 selects a single unit price code from the intermediate data 70.

[Step S206] The billing processing unit 120 determines whether the selected unit price code exists in the unit price management table 114. If the unit price code does not exist in the unit price management table 114, the billing processing unit 120 determines that the unit price code is a temporary unit price code, and the processing proceeds to step S207. If the unit price code exists in the unit price management table 114, the processing proceeds to step S210.

[Step S207] The billing processing unit 120 acquires the item name and the unit price corresponding to the selected unit price code (temporary unit price code) from the use result information 61 and 62.

[step S208] The billing processing unit 120 numbers the temporary unit price code in accordance with the naming convention.

[Step S209] The billing processing unit 120 adds the record including the numbered temporary unit price code and the item name and unit price (for example, a standard price without a discount) acquired in step S207 to the unit price management table 114. Next, the processing proceeds to step S205.

[Step S210] The billing processing unit 120 acquires the item name and the unit price corresponding to the selected unit price code from the unit price management table 114. The billing processing unit 120 adds the record including the selected unit price code and the acquired item name and unit price in the intermediate data 70.

[Step S211] The billing processing unit 120 determines whether all the unit price codes have been selected. If all the unit price codes have been selected, the processing proceeds to step S212. If there is any unit price code that has not been selected yet, the processing returns to step S205.

[Step S212] The billing processing unit 120 sorts the records having the same organization code in the intermediate data 70 according to the unit price codes.

[Step S213] The billing processing unit 120 aggregates the prices for each record group including the same organization code and unit price code. The prices are calculated in accordance with a calculation expression indicated by the user template 112.

[Step S214] The billing processing unit 120 aggregates the prices for each organization code and generates the billing data 71 to 73.

In this way, the organization-by-organization billing data 71 to 73 is generated. The billing data 71 to 73 is monthly generated, for example. When resources whose unit price tables are not registered in the unit price management table 114 are used in a month, the billing data 71 to 73 of this month is generated based on temporary unit price codes. Subsequently, the billing processing unit 120 performs processing for correcting the temporary unit price codes. In this way, in the subsequent months, the resources to which the temporary unit price codes have been assigned are processed based on the proper unit price codes in the organization-by-organization result aggregate processing.

Next, a procedure of the temporary unit price code correction processing will be described with reference to FIG. 17.

Figure 17:
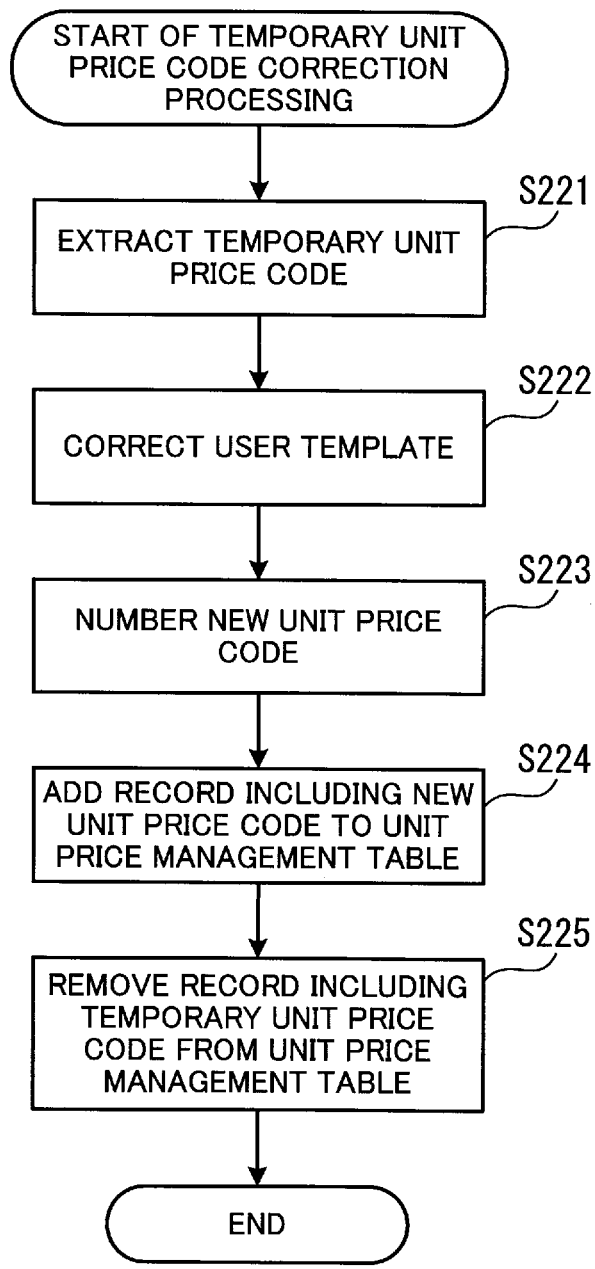
FIG. 17 is a flowchart illustrating an example of a procedure of temporary unit price code correction processing.

FIG. 17 is a flowchart illustrating an example of a procedure of the temporary unit price code correction processing. The processing illustrated in FIG. 17 will hereinafter be described step by step.

[Step S221] The billing processing unit 120 extracts a temporary unit price code from the unit price management table 114. For example, the billing processing unit 120 determines a unit price code that complies with the temporary unit price code naming convention to be a temporary unit price code.

[Step S222] The billing processing unit 120 corrects the user template 112 based on an input from a manager. For example, a manager adds a calculation expression for calculating the charge for a resource corresponding to the temporary unit price code in the user template 112.

[Step S223] The billing processing unit 120 numbers a new unit price code in accordance with a unit price code naming convention.

[Step S224] The billing processing unit 120 adds a record including the newly generated unit price code to the unit price management table 114. The information set in the record is inputted by the manager, for example.

[Step S225] The billing processing unit 120 removes the record including the temporary unit price code from the unit price management table 114.

In this way, the charges for the services of the clouds 30 and 40 are appropriately billed to the organizations 310, 320, and 330 based on respective usages by the organizations 310, 320, and 330.

Other Embodiments

In the second embodiment, while the multi-cloud management system 200 includes the resource creation assistance unit 210, for example, the individual terminal apparatuses 311, 321, and 331 may be allowed to have the functions of the resource creation assistance unit 210. In addition, of all the information in the storage unit 110 according to the second embodiment, the organization information 113 and the unit price management table 114, which are also used by the multi-cloud management system 200, may be included in the multi-cloud management system 200.

While embodiments have been described as examples, a unit indicated in any one of the above embodiments may be replaced by another unit having an equivalent function. Further, any other component or step may be added. Furthermore, two or more components (features) in the above embodiments may be combined.

According to one aspect, an appropriate charge based on usage of a service is calculated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing system comprising:
   a user tag addition apparatus including a first memory and a first processor which is connected to the first memory and performs a procedure including adding, to the service use requests, user tags including organization codes, which are identifiers of organizations to which terminal apparatuses that have transmitted service use requests belong, and unit price codes, which are identifiers indicating unit price information per unit usage of a resource for execution of provision services to be provided based on the service use requests;
   a service execution apparatus including a second memory and a second processor which is connected to the second memory and performs a procedure including executing the provision services based on the service use requests each time the service execution apparatus receives the service use requests and registering the user tags added to the service use requests and usages of the resource used for the execution of the provision services in association with each other in use result information; and
   a charge calculation apparatus including a third memory and a third processor which is connected to the third memory and performs a procedure including acquiring the use result information of a charge calculation target organization group from the service execution apparatus, extracting, based on the organization codes included in the user tags registered in the acquired use result information, the user tags for each organization that belongs to the charge calculation target organization group from the use result information, calculating charges for the provision services for the each organization based on unit price information corresponding to the unit price codes included in the extracted user tags and the usages of the resource associated with the user tags, calculating a total charge to be billed to the charge calculation target organization group based on the acquired use result information and a management charge for the user tag addition apparatus and the charge calculation apparatus, and calculating an amount to be billed to the each organization based on the total charge and the charges calculated for the each organization.

2. The information processing system according to claim 1, wherein the calculating of charges for the provision services by the charge calculation apparatus includes:
   acquiring, among the user tags registered in the use result information, a user tag including an organization code of one organization of the charge calculation target organization group and the usage of the resource associated with the acquired user tag; and
   calculating a charge to be billed to the one organization of the charge calculation target organization group by using a result obtained by multiplying the unit price information corresponding to the unit price code included in the acquired user tag by the acquired usage of the resource.

3. The information processing system according to claim 1, wherein the calculating of amounts by the charge calculation apparatus includes dividing the total charge according to the charges for the each organization to obtain the amount to be billed to the each organization.

4. The information processing system according to claim 1,
   wherein, when the unit price codes corresponding to the provision services to be executed based on the service use requests do not exist, the adding of user tags to service use requests by the user tag addition apparatus includes generating a temporary unit price code and including the generated temporary unit price code in the user tags, and
   wherein, when the temporary unit price code is included in the user tags, the calculating of charges by the charge calculation apparatus includes using, as a unit price corresponding to the temporary unit price code, a given unit price previously determined for the resource whose usage is associated with the user tag including the temporary unit price code.

5. The information processing system according to claim 1, wherein the third processor of the charge calculation apparatus further performs a procedure including transmitting billing data indicating the charges billed to the each organization to a billing processing system that manages payment of the charges billed to the each organization.

6. A charge calculation apparatus comprising:
   a memory; and
   a processor which is connected to the memory and performs a procedure including:
   acquiring, from a service execution apparatus, use result information of a charge calculation target organization group in which user tags including organization codes, which are identifiers of organizations to which terminal apparatuses that have transmitted service use requests belong, and unit price codes, which are identifiers indicating unit price information per unit usage of a resource for execution of provision services provided based on the service use requests and usages of the resource used for the execution of the provision services are registered in association with each other;
   extracting, based on the organization codes included in the user tags registered in the acquired use result information, the user tags for each organization that belongs to the charge calculation target organization group from the use result information;
   calculating charges for the provision services for the each organization based on unit price information corresponding to the unit price codes included in the extracted user tags and the usages of the resource associated with the user tags;
   calculating a total charge to be billed to the charge calculation target organization group based on the acquired use result information and a management charge for the user tag addition apparatus and the charge calculation apparatus; and
   calculating an amount to be billed to the each organization based on the total charge and the charges calculated for the each organization.

7. The charge calculation apparatus according to claim 6, wherein, when a temporary unit price code indicating that the unit price codes corresponding to the provision services executed based on the service use requests do not exist is included in the user tags, the calculating of charges includes using, as a unit price corresponding to the temporary unit price code, a given unit price previously determined for the resource whose usage is associated with the user tags including the temporary unit price code.

8. A non-transitory computer-readable storage medium storing a computer program that causes a computer to perform a procedure comprising:
- acquiring, from a service execution apparatus, use result information of a charge calculation target organization group in which user tags including organization codes, which are identifiers of organizations to which terminal apparatuses that have transmitted service use requests belong, and unit price codes, which are identifiers indicating unit price information per unit usage of a resource for execution of provision services provided based on the service use requests and usages of the resource used for the execution of the provision services are registered in association with each other;
- extracting, based on the organization codes included in the user tags registered in the acquired use result information, the user tags for each organization that belongs to the charge calculation target organization group from the use result information;
- calculating charges for the provision services for the each organization based on unit price information corresponding to the unit price codes included in the extracted user tags and the usages of the resource associated with the user tags;
- calculating a total charge to be billed to the charge calculation target organization group based on the acquired use result information and a management charge for the user tag addition apparatus and the charge calculation apparatus; and
- calculating an amount to be billed to the each organization based on the total charge and the charges calculated for the each organization.

9. The non-transitory computer-readable storage medium according to claim 8, wherein, when a temporary unit price code indicating that the unit price codes corresponding to the provision services executed based on the service use requests do not exist is included in the user tags, the calculating of charges includes using, as a unit price corresponding to the temporary unit price code, a given unit price previously determined for the resource whose usage is associated with the user tags including the temporary unit price code.

* * * * *